United States Patent
Cormode et al.

(10) Patent No.: US 8,484,269 B2
(45) Date of Patent: Jul. 9, 2013

(54) COMPUTING TIME-DECAYED AGGREGATES UNDER SMOOTH DECAY FUNCTIONS

(75) Inventors: Graham Cormode, Summit, NJ (US); Philip Korn, New York, NY (US); Srikanta Tirthapura, Ames, IA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1590 days.

(21) Appl. No.: 12/006,333

(22) Filed: Jan. 2, 2008

(65) Prior Publication Data
US 2009/0172058 A1 Jul. 2, 2009

(51) Int. Cl.
*G06F 1/02* (2006.01)
(52) U.S. Cl.
USPC .......................................... 708/270; 708/274
(58) Field of Classification Search
None
See application file for complete search history.

(56) References Cited

U.S. PATENT DOCUMENTS

| | | | |
|---|---|---|---|
| 6,826,697 B1 * | 11/2004 | Moran | 726/23 |
| 7,203,962 B1 * | 4/2007 | Moran | 726/23 |
| 7,246,227 B2 | 7/2007 | Kissel | |
| 7,283,566 B2 | 10/2007 | Siemens et al. | |
| 7,302,480 B2 | 11/2007 | Lahtinen | |
| 2003/0236652 A1 * | 12/2003 | Scherrer et al. | 703/2 |

OTHER PUBLICATIONS

N. Shrivastava, et al., "Medians and Beyond: New Aggregation Techniques for Sensor Networks", ACM SenSys '04, Nov. 3-5, 2004, Baltimore, MD. pp. 239-249.
G. Cormode, et al., "An Improved Data Stream Summary: The Count-Min Sketch and its Applications", J. Algorithms 55(1): 58-75, 2005.
G. Cormode, et al., "Time-Decaying Aggregates in Out-of-order Streams", DIMACS Technical Report 2007—Jul. 10, 2007.

* cited by examiner

*Primary Examiner* — Michael D Yaary
(74) *Attorney, Agent, or Firm* — Wolff & Samson PC

(57) ABSTRACT

Aggregates are calculated from a data stream in which data is sent in a sequence of tuples, in which each tuple comprises an item identifier and a timestamp indicating when the tuple was transmitted. The tuples may arrive at a data receiver out-of-order, that is, the sequence in which the tuples arrive are not necessarily in the same sequence as their corresponding timestamps. In calculating aggregates, more recent data may be given more weight by a decay function which is a function of the timestamp associated with the tuple and the current time. The statistical characteristics of the tuples are summarized by a set of linear data summaries. The set of linear data summaries are generated such that only a single linear data summary falls between a set of boundaries calculated from the decay function and a set of timestamps. Aggregates are calculated from the set of linear data summaries.

25 Claims, 5 Drawing Sheets

COMPUTING TIME-DECAYED AGGREGATES UNDER SMOOTH DECAY FUNCTIONS

STATEMENT REGARDING FEDERALLY SPONSORED RESEARCH OR DEVELOPMENT

This invention was made with government support under Contract No. CNS0520102 from the National Science Foundation. The United States Government has certain rights in the invention.

CROSS-REFERENCE TO RELATED APPLICATION

This application is related to U.S. patent application Ser. No. 12/006,338, filed Jan. 2, 2008, and subsequently published as U.S. Patent Application Publication No. 2009/0172059, entitled Computing Time-Decayed Aggregates in Data Streams, which is being filed concurrently herewith and which is herein incorporated by reference in its entirety.

BACKGROUND OF THE INVENTION

The present invention relates generally to data processing, and more particularly to computing time-decayed aggregates under a smooth decay function.

Statistical analysis of data is a core process for characterizing and controlling systems. In many applications, large volumes of data are generated from multiple data sources as multiple data streams, in which data is updated frequently. In some instances, the updates may be considered to be continuous, or near-continuous. In an industrial application, for example, sensors may provide real-time measurements of process variables such as position, velocity, acceleration, temperature, pressure, humidity, and chemical concentration to a monitoring and control station. In a financial application, multiple order-entry systems may provide near real-time updates of stock prices to a central transaction system. A major application is transport of data across a packet data network. E-mail, instant messaging, file transfers, streaming audio, and streaming video applications may generate large streams of data from multiple data sources, such as personal computers and web servers, across a packet data network. Network operations, administration, maintenance, and provisioning (OAM&P) require accurate characterization of data streams. Network performance and reliability, for example, depend on the traffic capacity of the network infrastructure equipment (such as routers, switches, and servers), on the traffic capacity of the communication links between network infrastructure equipment, and on the network architecture.

In some applications, data may be captured, statically stored in a database, and post-processed. In other applications, real-time, or near real-time, analysis is required. For example, if data traffic to a specific router is becoming excessive, new data traffic may be dynamically re-directed to another router. As another example, if an excessive number of users are accessing a web server, new users may be dynamically re-directed to a mirror server. In applications such as real-time control, the most recent data may have the highest relevancy. Particularly when the data streams are large, selectively filtering the most recent data for analysis reduces the required computational resources, such as processor speed and memory capacity, and computational time.

Commonly, what constitutes the most recent data, for example, is determined by the arrival time of the data at the network element (data receiver) which collects the data. The underlying assumption is that the time order in which the data arrives at the data receiver is the same time order in which the data sources generated the data. In applications such as transport of data across a packet data network, however, this assumption may not hold. For example, if data is generated by multiple sensors and the data is transported across a packet data network to a single monitoring and control station, the data from each sensor may be transported across different routes. The delay across one route may differ from the delay across a different route. In general, the delay across a specific route may be a function of overall data traffic across that route. If the overall data traffic is variable, the delay may also be variable. Consider the example in which data from sensor 1 is generated before data from sensor 2. At a particular instance, the data from sensor 1 may arrive at the monitoring and control station ahead of the data from sensor 2. At a later instance, however, under a different set of network conditions, the data from sensor 2 may arrive ahead of the data from sensor 1.

Even if the data is generated by a single data source, the data may arrive at a data receiver out-of-order. In a packet data network, user data may be segmented into multiple data packets. Depending on the configuration of the packet data network, there may be multiple routes between the data source and the data receiver. As discussed above, the delay across one route may differ from the delay across a second route. Consider the example in which data packet 1 is generated before data packet 2. If the two data packets are transmitted across different routes, and if the delay across the route for data packet 1 sufficiently exceeds the delay across the route for data packet 2, then data packet 2 may arrive before data packet 1.

Statistical properties of data streams are characterized by aggregate statistical values (which are referred to herein simply as aggregates), such as the average number of packets per unit time or the quantile distribution of the number of packets per unit time. In general, an aggregate is a user-defined aggregate function. Calculating aggregates from large volume unordered data streams may be computationally intensive. Herein, an unordered data stream is a data stream in which the age (recency) of the data and the time order of the data are not taken into account. If the age of the data and the time order of the data are of significance, then, in general, calculating aggregates requires additional computational resources and additional computational time. Biasing the values of the aggregates towards recent data may be performed by multiplying the data packets by a time-dependent weighting function (referred to as a decay function) in which the weight accorded recent data is larger than the weight accorded older data. Different decay functions are used to treat different applications under different conditions. Since the number of applications and conditions may be large, what are needed are method and apparatus for efficiently calculating age-dependent aggregates from large volume data streams in which the data may be received in arbitrary time order, and in which a broad class of decay functions may be used.

BRIEF SUMMARY OF THE INVENTION

Data streams arriving at a data receiver may comprise data of different age. In calculating statistical aggregates, more recent data may have more relevance than older data. In an embodiment of the invention, the data stream is comprised of a sequence of tuples, in which each tuple comprises an item identifier and an associated timestamp. The timestamp indicates the time at which the tuple was transmitted by a data source. A decay function is used to give higher weight to more recent items. Statistical characteristics of the tuples are summarized in a set of linear data summaries, which may be compressed to reduce required computer resources, for example, memory and computational time. The set of linear data summaries accommodates tuples which may arrive out-of-order, that is, tuples which do not arrive in the same sequence as their timestamps. A specific linear data summary summarizes the statistical characteristics of tuples with a timestamp falling within a specific range of timestamps. The range of timestamps is calculated based at least in part on a set of boundaries calculated from the decay function. Only one linear data summary is allowed between a set of specific boundaries. If more than one linear data summary is generated, the linear data summaries are merged. User-defined aggregate functions may be efficiently calculated from the set of linear data summaries with deterministic error bounds.

These and other advantages of the invention will be apparent to those of ordinary skill in the art by reference to the following detailed description and the accompanying drawings.

DETAILED DESCRIPTION

Figure 1:
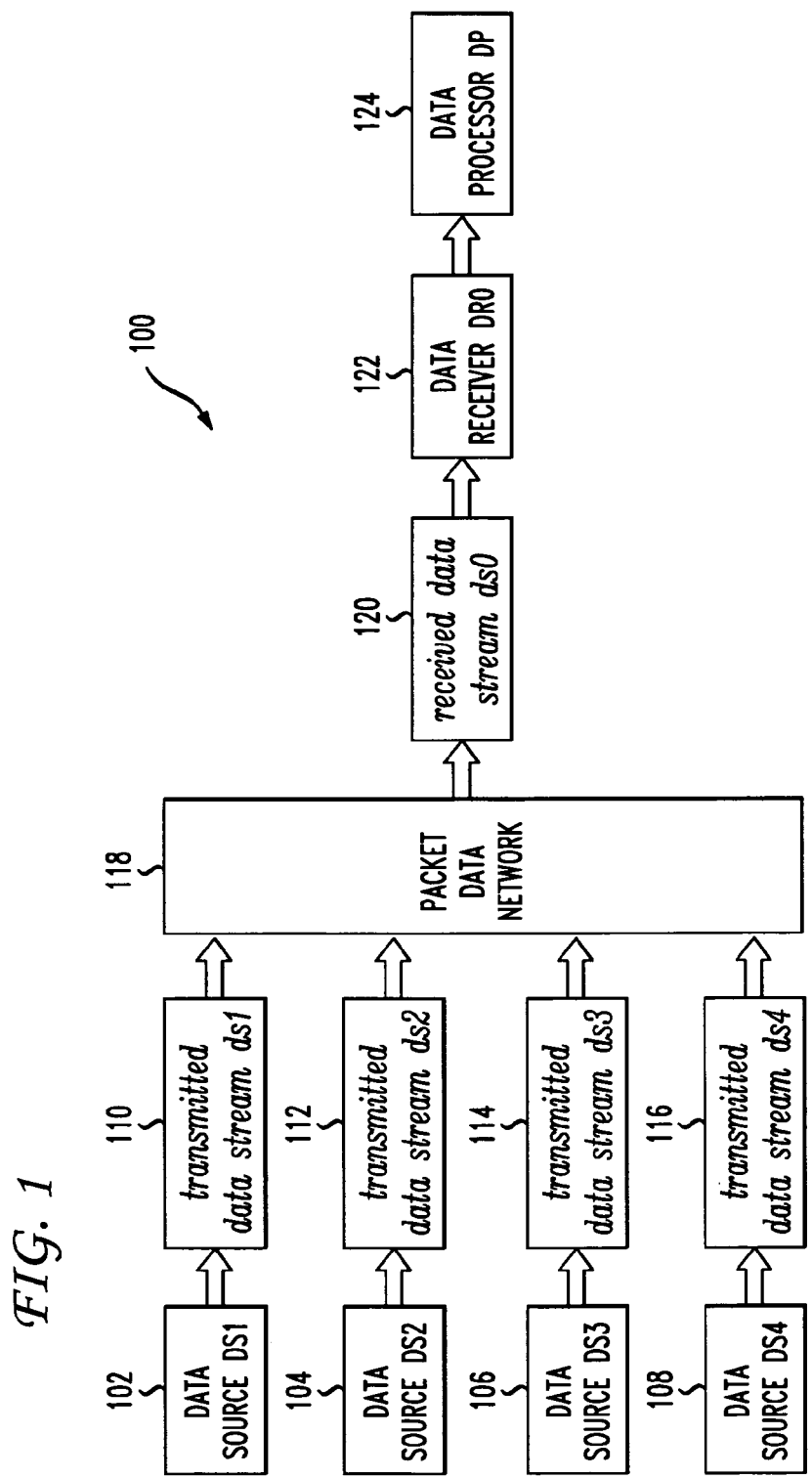
FIG. 1 shows a schematic of a data measurement system in a packet data network.

FIG. 1 shows a high-level schematic of data measurement system 100. In this example, there are four data sources, DS1 102-DS4 108. Each data source generates an independent data stream. The transmitted data streams corresponding to data sources DS1 102-DS4 108 are transmitted data streams ds1 110-ds4 116, respectively. The transmitted data streams ds1 110-ds4 116 are transported across packet data network 118 to a single data receiver DR0 122. In general, there may be multiple data receivers. In general, a data receiver may receive multiple data streams from multiple packet data networks through multiple ports. The multiple received data streams, however, may be viewed as a single virtual received data stream. In the example shown, the transmitted data streams ds1 110-ds4 116 are combined into a single virtual received data stream ds0 120. The received data stream ds0 120 is processed by data processor DP 124. In FIG. 1, data receiver DR0 122 and data processor DP 124 are shown as separate network elements, such as a router and a workstation, respectively. Data receiver DR0 122 and data processor DP 124, however, may also be integrated into a single network element, such as a server.

Herein, a data stream is represented by an unbounded sequence of tuples $e_i = <x_i, w_i, t_i>$, where i is a sequential integer index, $x_i$ is the identifier of an item, $w_i$ is an initial weighting factor, and $t_i$ is a timestamp. The index i indicates the arrival order in which a tuple is received at a data receiver. An identifier may be a simple sequence label, such as $data_1$, $data_2$, $data_3$ . . . , or $packet_1$, $packet_2$, $packet_3$ . . . . In general, an identifier is a user-defined designation. An item herein refers to user-defined data, which may include values of multiple parameters. For example, in an industrial application, an item may be the value of a single parameter such as temperature, or an item may be the values of a pair of parameters such as temperature and pressure. In a packet data network, an item may be the single value of the source address, or an item may be the values of the (source address, destination address) pair. In another example, an item may include the message body in addition to the source and destination addresses. To simplify the terminology herein, an item with the identifier $x_i$ is referred to as item $x_i$. The initial weighting factor $w_i$ modifies the sensitivity of aggregates (see below) to the value of an individual tuple. If the item is a data packet, for example, a weighting factor may be the number of bytes in the data packet. Embodiments may be applied to tuples with arbitrary initial weighting factors $w_i$. To simplify the discussion, in the examples below, the weighting factors are all set equal to 1. The timestamp $t_i$ is the time at which the item was generated by a data source, for example, data source DS1 102 in FIG. 1. The value of the timestamp $t_i$ is referenced to the local clock of the data source issuing the timestamp.

As discussed above, data measurement system 100 includes four data sources DS1 102-DS4 108, generating transmitted data streams ds1 110-ds4 116, respectively. Each transmitted data stream may be represented by the tuples $e_{n,i} = <x_{n,i}, t_{n,i}>$, where n=1-4 is an index representing the number of the data source. That is, data sources DS1 102-DS4 108 correspond to n=1-4, respectively. In examples discussed below, the data analysis is performed on the combined data on received data stream ds0 120. Therefore, the notation herein is simplified by including the source index n as a value in the identifier $x_i$. The received data stream ds0 120, then, is represented by the tuples $e_i = <x_i, t_i>$. Note that multiple items may have the same timestamp $t_i$. In an advantageous embodiment, the clocks of data sources DS1 102-DS4 108 and data receiver DR0 122 are all synchronized. For example, a synchronization scheme such as network time protocol (NTP) may be used. One skilled in the art may apply other embodiments to data measurement systems in which the clocks are not synchronized. For example, the offsets of the clocks may be determined in advance of the data measurements, and appropriate correction factors may be applied.

Herein, a sequence of tuples is in-order if they arrive at a receiver in the same sequence as their timestamps. For example, consider the tuples in the received data stream ds0 120. As the tuples arrive at the data receiver DR0 122, if the timestamp of a tuple is greater than or equal to the timestamp of the previous tuple, then the tuples are in-order. For example, a sequence of three tuples may arrive in-order with timestamps of 1, 2, and 3 ms, respectively. As discussed above, however, depending on network conditions, tuples may arrive out-of-order. For example, a sequence of three tuples may arrive out-of-order with timestamps of 1, 3, and 2 ms, respectively. The current time is designated herein as time t. The reference for the current time is user-definable. For example, the current time t may be the time at which a tuple in the received data stream ds0 120 is received by data receiver DR0 122 (also referred to as observation time). In another example, the current time t may be the time at which a tuple is processed by data processor DP 124 (also known as query time). In general, there may be a delay between the time at which a tuple is received and the time at which a tuple is processed. As discussed below, processing a data stream of tuples includes calculating aggregates. The age of an item in tuple $<x_i, t_i>$ is referred to herein as the difference between the current time and the time at which the item was generated by the data source, as specified by the timestamp. Let $a_i$ represent the age of item in tuple $<x_i, t_i>$, then $a_i = t - t_i$. To simplify the terminology, an item in tuple $<x_i, t_i>$ is referred to as item $<x_i, t_i>$. As discussed above, for some applications, recent data is more significant than earlier data. The degree of significance may be varied by applying an age-dependent weighting factor to an item, such that more recent items, which have a lower age, receive higher weighting factors than older items, which have a higher age.

In an embodiment, time-dependent weighting factors may be generated by decay functions. Different decay functions may be chosen to model different applications. Herein, a function g(a) is a decay function if it satisfies the following two properties:

$$g(0)=1 \text{ and } 0 \leq g(a) \leq 1 \text{ for all } a \geq 0, \text{ and } g \text{ is monotone decreasing: if } a_1 > a_2, \text{ then } g(a_1) \leq g(a_2). \quad (E1)$$

Examples of decay functions include the following:

Exponential Decay. The decay function is $g(a)=\exp(-\lambda a)$ where $\lambda$ is a decay parameter with values $\lambda>0$. With this decay function, the time for g to drop by a constant fraction is the same, that is, $g(a)/[g(A+a)]$ for a fixed A is the same for all a.

Polynomial Decay. The decay function is $g(a)=(a+1)^{-a}$, where a is a decay parameter. It may be used in applications in which exponential decay is too fast.

Advantageous embodiments of the invention may be used to calculate aggregates under decay functions which may treat a large range of applications. These decay functions belong to the broad class of smooth decay functions. Smooth decay functions are defined as follows. If a decay function g(a) is continuous, then let $\dot{g}(a)$ denote the derivative of g(a) with respect to a at age a. A decay function g(a) is defined to be smooth if for all a, $A>0$, $$\dot{g}(a)g(a+A) \leq \dot{g}(a+A)g(a) \quad (E2)$$

Exponential decay functions and polynomial decay functions belong to the class of smooth decay functions, but sliding-windows decay functions do not, since they are not continuous.

In many applications, the characteristics of individual tuples are not critical. Aggregate statistical values from a large set of tuples are often used to characterize a data stream. For simplicity, aggregate statistical values are referred to herein as aggregates. Common examples of aggregates include averages and medians. Embodiments may be applied to calculate arbitrary aggregates, referred to herein as user-defined aggregate functions. In the discussions below, examples of aggregates are counts, ranges, quantiles, and heavy hitters. A heavy hitter is an item which appears frequently. The criteria for a heavy hitter is user-definable; for example, using a $\phi$-parameter as discussed below. As discussed above, calculation of time-decayed aggregates of data streams, in which items may arrive out of order, are important for many applications.

Herein, the following terms are defined for a given input data stream $S=\{<x_i, t_i>\}$:

Decayed Weight. The decayed weight of an item at time t is $g(a_i)=g(t-t_i)$

Decayed Count. The decayed count of the stream at time t is $$D(t) = \sum_i g(a_i)$$

Decayed $\phi$-Quantile. The decayed $\phi$-quantile of the data stream is the item q satisfying $$\sum_{i,x_i<q} g(a_i) \leq \phi D \text{ and } \sum_{i,x_i \leq q} g(a_i) > \phi D$$

Decayed $\phi$-Heavy Hitters. The decayed $\phi$-heavy hitters are the set of items $\{p\}$ satisfying $$\sum_{i,x_i=p} g(a_i) \geq \phi D$$

If there is no time decay [g(a)=1 for all a], the values of the aggregates are independent of the timestamps $t_i$, and, therefore, independent of arrival order. With time decay, the values of the aggregates do depend on the arrival order. Solving for the exact values of the decayed $\phi$-quantile and of the decayed $\phi$-heavy hitters requires considerable computational resources. In embodiments, the following approximate solutions are used to reduce the required computational resources:

Approximate Solution for Decayed $\phi$-Quantile. For $0<\epsilon<\phi\leq 1$, the $\epsilon$-approximate decayed $\phi$-quantile is calculated by calculating an item q satisfying $$(\phi-\epsilon)D \leq \sum_{i,x_i<q} g(a_i) \leq (\phi+\epsilon)D$$

Approximate Solution for Decayed $\phi$-Heavy Hitters. For $0<\epsilon<\phi\leq 1$, the $\epsilon$-approximate decayed $\phi$-heavy hitter is calculated by calculating a set of items $\{p\}$ satisfying $$\sum_{i,x_i=p} g(a_i) \geq (\phi-\epsilon)D,$$

and omitting no q such that $$\sum_{i,x_i=q} g(a_i) \geq (\phi+\epsilon)D$$

Since the value of the decay function depends on the query time (time at which the value of the aggregate is processed or calculated), the values of the approximate decayed aggregate solutions depend on the query time. Herein, a query is a user-defined operation. For example, a query may be the calculation of an aggregate. As another example, a query may be a search for a particular data value in a set of data. The result of a query is referred to herein as the answer to the query.

Processing raw data streams requires considerable computational resources (for example, memory and processor capability) and computational time. To reduce the required resources, raw data streams may be initially processed in data structures referred to as data summaries. A data summary does not record a raw data stream, but rather, a set of statistical characteristics of the raw data stream. There is a tradeoff between the set of statistical characteristics recorded and the detailed information that may be calculated from the data summary. Reducing the set of statistical characteristics recorded reduces the required computational resources required. The amount of information that may be calculated, however, is also reduced. An example is discussed below.

Aggregates are calculated from the data summary instead of the raw data stream. A data summary may be configured to maintain the error in the calculation of an aggregate to within user-defined bounds. In general, data is summarized by a set of data summaries. For example, data summary 1 may summarize data set 1, and data set 2 may summarize data set 2. A data summary of the combined set of data (data set 1 and data set 2) may be summarized by a data summary calculated from the set of data summaries (data summary 1+data summary 2).

Advantageous embodiments use linear data summaries. Herein, a data summary is a linear data summary if it satisfies the following two conditions.

- If dataset (1) is summarized by data summary (1) and dataset (2) is summarized by data summary (2), then the union of dataset (1) and dataset (2) may be summarized by merging data summary (1) and data summary (2).
- If a dataset (1) is linearly scaled to generate dataset (2), then the data summary for dataset (2) is generated by linearly scaling the data summary for dataset (1).

Examples of linear data summaries are counts, random samples, and count-min sketches (see, for example, G. Cormode and S. Muthukrishnan, J. of Algorithms, 55(1): 58-75, 2005). An advantageous linear data summary is a quantile-digest (q-digest) (see, for example, N. Shrivastava, et al., ACM SenSys '04, 2004). Given a parameter $0<\epsilon<1$, a q-digest summarizes the frequency distribution $f_i$ of a multiset defined by a stream of N items drawn from the domain $[0 \ldots W-1]$. The q-digest may be used to estimate the rank of an item q, which is defined as the number of items dominated by q, that is $$r(q) = \sum_{i<q} f_i.$$

The data structure maintains an appropriately defined set of dyadic ranges $\subseteq [0 \ldots W-1]$ and their associated counts. A dyadic range is a range of the form $[i2^j \ldots (i+1)2^j-1]$ for non-negative integers i,j. That is, its length is a multiple of two, and it begins at a multiple of its length. An arbitrary range of integers $[a \ldots b]$ may be uniquely partitioned into at most $2 \log_2 (b-a)$ dyadic ranges, with at most 2 dyadic ranges of each length. The q-digest has the following properties:

Each range, count pair (r, c(r)) has $$c(r) \leq \frac{\epsilon N}{\log_2 W},$$

unless r represents a single item.

Given a range r, denote its parent range as par(r), and its left and right child ranges as left(r) and right(r), respectively. For every (r, c(r)) pair, $$c(par(r)) + c(\text{left}(par(r))) + c(\text{right}(par(r))) \geq \frac{\epsilon N}{\log_2 W}.$$

If the range r is present in the data structure, then the range par(r) is also present in the data structure.

Given query point $q \in [0 \ldots W-1]$, an estimate of the rank of q, denoted by $\hat{r}(q)$, may be computed as the sum of the counts of all ranges to the left of q, that is, $$\hat{r}(q) = \sum_{(r=[l,h],c(r)),h<q} c(r).$$

The following accuracy guarantee may be shown for the estimate of the rank: $\hat{r}(q) \leq r(q) \leq \hat{r}(q)+\epsilon N$. Similarly, given a query point q, the frequency $f_q$ of item q may be estimated as $\hat{f}_q = \hat{r}(q+1)-\hat{r}(q)$, with the following accuracy guarantee: $\hat{f}_q -\epsilon N \leq f_q \leq \hat{f}_q +\epsilon N$. The q-digest may be maintained in space $$O\left(\frac{\log W}{\epsilon}\right).$$

For simplicity, herein, log refers to $\log_2$. Updates to a q-digest may be performed in time $O(\log \log W)$, by binary searching the $O(\log W)$ dyadic ranges containing the new item to find the appropriate place to record its count. Queries take $$O\left(\frac{\log W}{\epsilon}\right).$$

The q-digest does not require that all items have unit weight, but can be modified to accept updates with arbitrary (that is, fractional) non-negative weights. Also, multiplying all counts in the data structure by a constant $\gamma$ gives an accurate summary of the input scaled by $\gamma$. The properties of the data structure still hold after these transformations.

Figure 2:
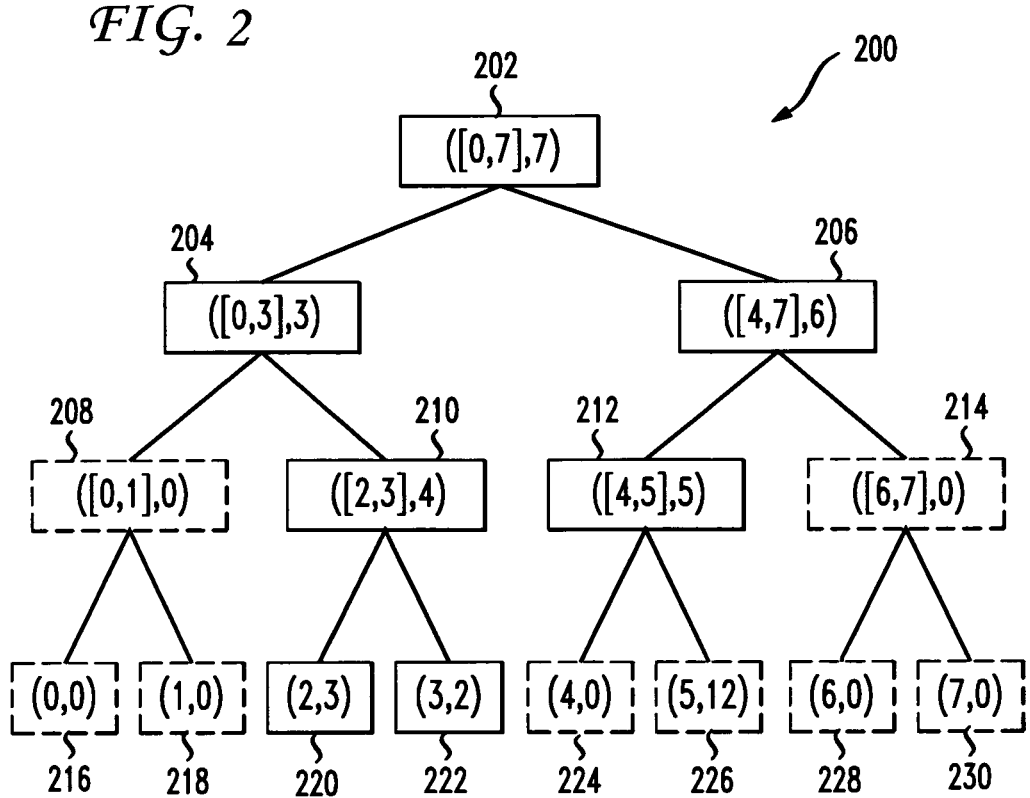
FIG. 2 shows a tree representation of a q-digest data structure.

As an example, FIG. 2 shows a schematic of q-digest 200, which is represented as a binary tree with nodes 202-230. In this example, the output of a measurement (data value) is an integer in the set of 8 integers $[0, \ldots, 7]$. A complete set of data would report the counts for each integer value. Q-digest 200 records the total counts over ranges of possible data values. Each node 202-230 is labeled with the (range=r, count=c(r)) pair inside the rectangle. The leaf nodes 216-230 represent the full set of integer outcomes $[0, \ldots, 7]$. Therefore, for leaf nodes, the range is a single integer. For the higher-order nodes, 202-214, the range spans more than one integer and is denoted by the pair [min value of range, max value of range]. For nodes 208-214, the ranges are, respectively, [0,1], [2,3], [4,5], and [6,7]. For nodes 204 and 206, the ranges are, respectively, [0,3] and [4,7]. The range for the root node 202 is [0,7]. The q-digest records the count in the nodes with a non-zero count. In FIG. 2, the solid rectangles represent nodes with a non-zero count, and the dashed rectangles represent nodes with a zero count. The q-digest therefore records the (range=r, count=c(r)) pair for nodes 220, 222, 226, 210, 212, 204, 206, and 202. Here, the total count in the q-digest 200 is N=42.

Figure 3:
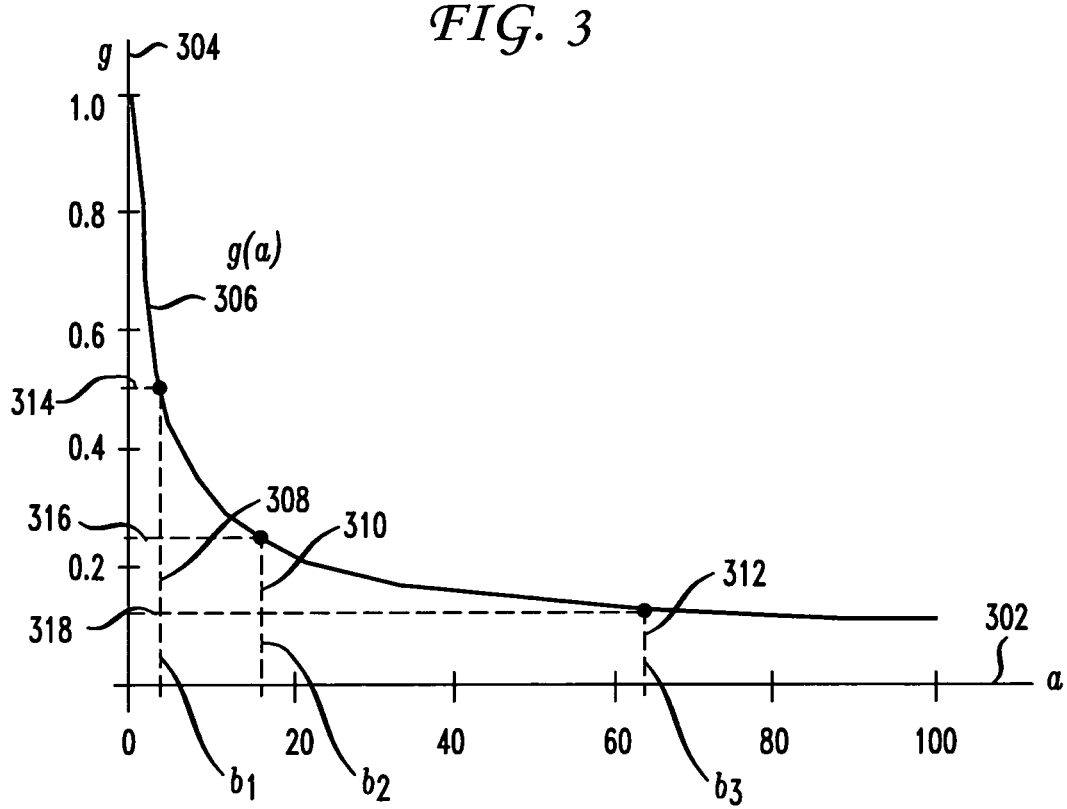
FIG. 3 shows a plot of a smooth decay function.

According to one embodiment, approximate values of time-decayed aggregates may be calculated based on tracking a set of value divisions, referred to herein as a set of boundaries. Given a smooth decay function g, a set of boundaries on ages, $b_i$, is defined such that such that $g(b_i)=(1+\theta)^{-i}$, where $\theta$ is an accuracy parameter. A small set of linear data summaries of the input items are maintained. Each linear data summary $s_j$ corresponds to items drawn from the input items within a range of ages. These ranges fully partition the time from 0 to t, such that no intervals overlap. Thus linear data summary $s_j$ summarizes all items with timestamps between times $t_j$ and $t_{j+1}$. A new arriving item with a timestamp between times $t_j$ and $t_{j+1}$ is added to linear data summary $s_j$. FIG. 3 shows a plot of a smooth decay function. The horizontal axis 302 represents values of the age variable a. The vertical axis 304 represents the corresponding values of the decay function g. Curve 306 represents an example of a smooth decay function g(a). Shown are a set of three boundaries $b_1$ 308, $b_2$ 310, and $b_3$ 312. The corresponding values of the decay function are $g(b_1)$ 314, $g(b_2)$ 316, and $g(b_3)$ 318.

The set of boundaries are used to define the summary time intervals. For all boundaries $b_i$ at time t, there is at most one linear data summary $s_j$ such that $$(t-b_i) < t_{j+1} < t_j < (t-b_{i+1}) \tag{E3}$$

To maintain this, if a pair of adjacent linear data summaries j, j+1 such that $$(t-b_i) < t_{j+2} < t_j < (t-b_{i+1}) \tag{E4}$$

(that is, both linear data summaries fall between adjacent boundaries), then the linear data summaries $s_j$ and $s_{j+1}$ are merged to summarize the range from $t_j$ to $t_{j+2}$. The time ranges of the linear data summaries, and the way in which they are merged, depend only on the time and on the set of boundaries, and not on any features of the arrival stream. This accommodates out-of-order arrivals. As discussed above, a sequence of tuples is in-order if they arrive at a receiver in the same sequence as their timestamps. A new arriving tuple $<x_i, t_i>$ is out-of-order if its timestamp $t_i$ has a value less than the values of previously recorded timestamps. Since the linear data summaries partition the time domain, the update is processed by finding the summary which covers $t_i$, and including the item in that linear data summary. According to an embodiment, given a linear data summary process, a $(1+\theta)$ accurate answer to decay queries (for example, polynomial decay queries) may be calculated by storing $O(\log_{1+\theta} g(t))$ linear data summaries. Updates take amortized time $O(\log g(t))$. An accurate linear data summary may be built by combining stored linear data summaries, and there is a bound on the number of linear data summaries stored.

Figure 4:
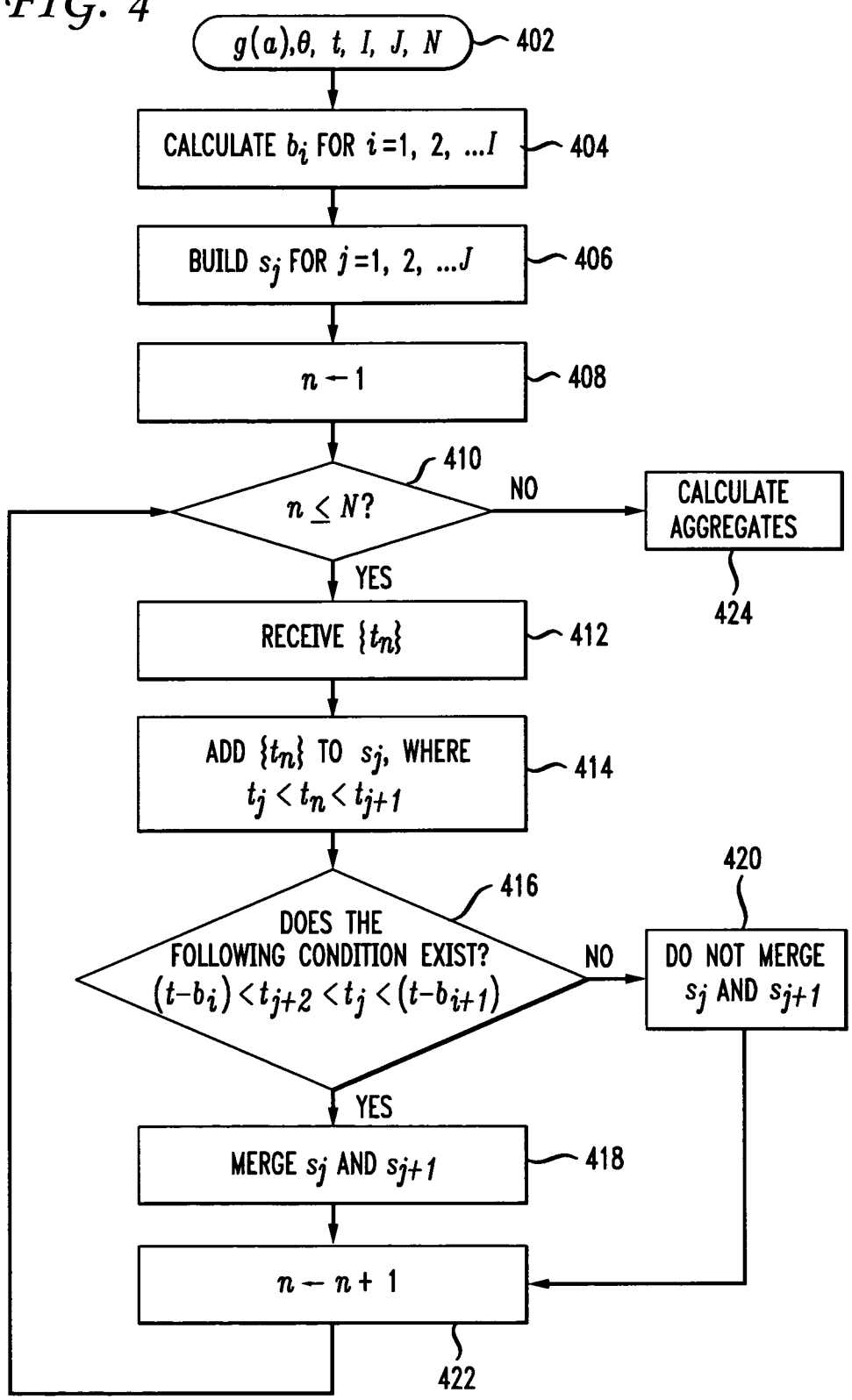
FIG. 4 shows a high-level flowchart of a process for calculating aggregates by value division; and, FIG. 5 shows a schematic of a computer for computing time-decayed aggregates in out-of-order data streams.

FIG. 4 shows a high-level flowchart for an embodiment of the value-division process. In step 402, the following user-defined values are provided as input.

Decay function g(a)
Accuracy parameter $\theta$
t current time
I maximum number of boundaries
J maximum number of linear data summaries
N maximum number of items.

In step 404, the set of boundaries $b_i$ where i=1, 2, ... I, are calculated. The process then passes to step 406, in which the set of linear data summaries $s_j$, where j=1, 2, ... J, are calculated. The process then passes to step 408, in which n, the index of the item with timestamp $t_n$, denoted as $\{t_n\}$, is initialized to 1. The process then passes to step 410, in which the index n is compared with the maximum value N (maximum number of items being received for analysis). As discussed above, the data stream comprises an unbounded sequence of tuples. In this example, a finite set of items is sampled. For the first iteration, n≦N, and the processes passes to step 412, in which the item $\{t_n\}$ is received. The process then passes to step 414, in which the item $\{t_n\}$ is added to the appropriate linear data summary, $s_j$, where $t_j < t_n < t_{j+1}$. The process then passes to step 416, in which the following condition is examined $$(t-b_i) < t_{j+2} < t_j < (t-b_{i+1}) \tag{E5}$$

If condition (E5) is not satisfied, then the process passes to step 420 and linear data summaries are not merged. The process then passes to step 422, in which n is incremented by 1. Returning to step 416, if the condition (E5) is satisfied, then the process passes to step 418, in which linear data summaries $s_j$ and $s_{j+1}$ are merged. The process then passes to step 422, as before. The process then returns to step 410. Step 412—step 420 are then iterated until all N items have been processed. The process then passes to step 424, in which the aggregates are calculated.

To answer queries, a process similar to the one discussed above is followed. For each linear data summary, the age of the most recent item summarized, $a_r$, is determined and the linear data summary is linearly scaled by $g(a_r)$. All the scaled linear data summaries are then merged together. The query is answered by probing the scaled and merged linear data summary. Since the range of ages of items in the linear data summary is bounded by a $(1+\theta)$ factor, the error introduced by treating all items as the same age is at most $(1+\theta)$. The number of linear data summaries stored is bounded in terms of the duration of the data (or on a cut off point W beyond which the boundary condition g(a>W)=0 is enforced). At any instant, each linear data summary either falls between two boundaries, or crosses a boundary. There is at most one linear data summary falling between each boundary, which is associated with the boundary to its left. Therefore the number of linear data summaries stored is equal to twice the number of boundaries which have input items older than them. The final such boundary, $b_k$, therefore satisfies the relationship $g(t) \geq b_k = (1+\theta)^{-k}$, since the oldest item has age at most t. Thus, $k = -\ln(g(t))/\ln(1+\theta)$, and hence the number of linear data summaries is $$O\left(\frac{1}{\theta} \ln\left(\frac{1}{g(t)}\right)\right).$$

An embodiment of a process for calculating time-decayed quantiles is described herein for a polynomial decay function $g(a) = \exp(-a \ln(1+a))$. A q-digest data structure is used for a linear data summary. Regular (no decay) quantiles may be answered with error $\beta$ using a linear data summary of size $$O\left(\frac{\log U}{\beta}\right),$$

where U denotes the size of the domain from which the quantiles are drawn. Since the data structure is a linear data summary, it may be used with a polynomial decay function. The total space required is therefore $$O\left(\frac{1}{\theta} \ln(1/g(t)) \cdot \frac{\log U}{\beta}\right) = O\left(\frac{\alpha}{\theta\beta} \ln t\right)$$

for polynomial decay. The total approximation error is, in the worst case, $(\theta+\beta)D$. In order to guarantee overall error of $\epsilon D$, the following condition is met: $\theta+\beta = \epsilon$. The space is minimized by $\theta = \beta = \epsilon/2$, giving $$O\left(\frac{\log U}{\epsilon^2} \log t\right)$$

overall. The time cost is $O(\log t)$ amortized per update.

In some embodiments, as described above, the decay function, g(a), used to set the boundary values is user defined (see FIG. 3). Results may be generated for decay functions which are extensions of the initial user-defined decay function. For example, if a set of boundaries are based on $g(a)=(1+a)^{-2}$, a set of boundaries may be obtained at $a=1$, $(1+\theta)^{1/2}$, $(1+\theta)$, $(1+\theta)^{3/2}$ .... This is a superset of the set of boundaries created for $g'(a)=(1+a)^{-1}$ (that is, $a=1$, $(1+\theta)$, $(1+\theta)^2$)...). Therefore, the data structure used for $g(a)$ may also be used for $g'(a)$. Given the results calculated with a value-division process with a set of boundaries $b_i$ based on an initial user-defined decay function $g(a)$ and parameter $\theta$, at query time, a $(1+\theta')$ accurate answer may be built for any smooth decay function $g'(a)$, provided that $\forall i. g(b_i)/g(b_{i+1}) \leq (1+\theta')$. Thus, a set of boundaries may be initially based on a particular function g and $\theta$ value, and a new function $g'(a)$ that is "weaker" than g (decays less quickly) may be specified, getting a guarantee with a $\theta'$ that is better than the original $\theta$. Similarly, a $g'(a)$ that is stronger than g (decays faster) may be specified, and a result may still be obtained, but with larger $\theta'$. For example, creating a set of boundaries based on $\theta$ and $g(a)=(1+a)^{-a}$ gives a set of boundaries that are valid for $g'(a)=(1+a)^{-2a}$ with $\theta'=2\theta+\theta^2$.

Figure 5:
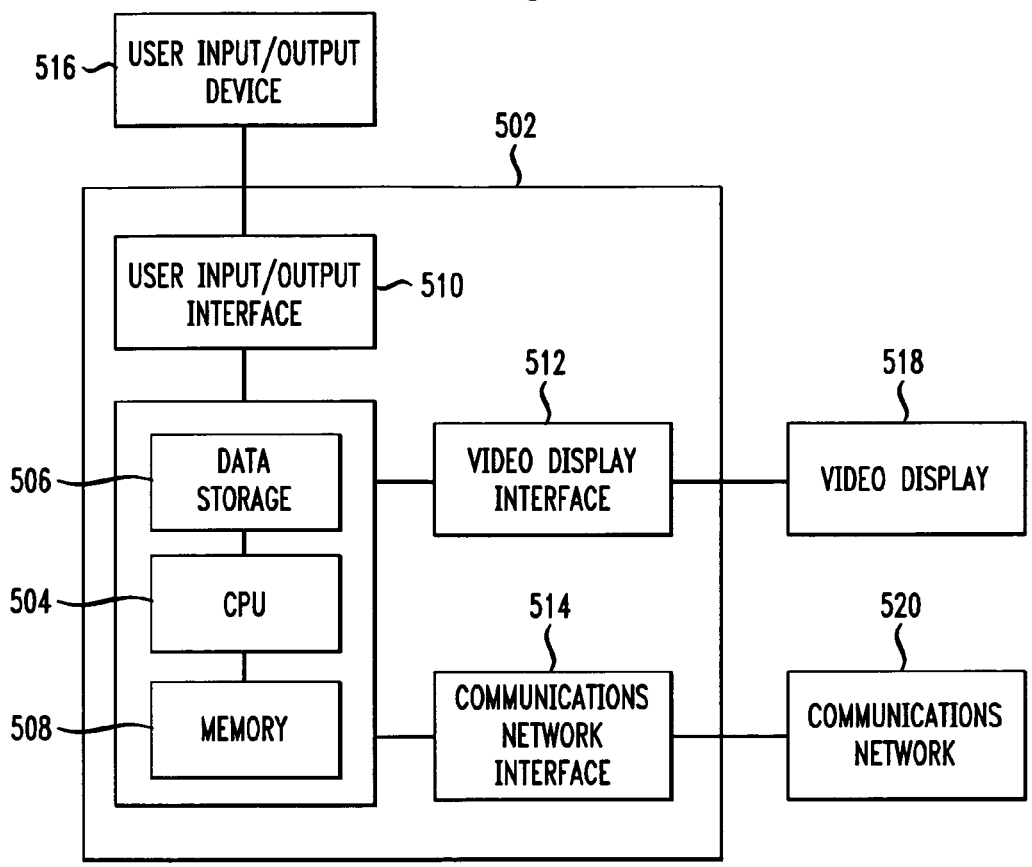

One embodiment of a data processor for computing time-decayed aggregates in out-of-order data streams may be implemented using a computer. For example, the steps shown in the flowchart in FIG. 4 may be implemented using a computer. As shown in FIG. 5, computer 502 may be any type of well-known computer comprising a central processing unit (CPU) 504, memory 508, data storage 506, and user input/output interface 510. Data storage 506 may comprise a hard drive or non-volatile memory. User input/output interface 510 may comprise a connection to a user input device 516, such as a keyboard or mouse. As is well known, a computer operates under control of computer software which defines the overall operation of the computer and applications. CPU 504 controls the overall operation of the computer and applications by executing computer program instructions which define the overall operation and applications. The computer program instructions may be stored in data storage 506 and loaded into memory 508 when execution of the program instructions is desired. Computer 502 may further comprise a video display interface 512, which may transform signals from CPU 904 to signals which may drive video display 518. Computer 502 may further comprise one or more network interfaces. For example, communications network interface 514 may comprise a connection to an Internet Protocol (IP) communications network 520, which may transport user traffic. For example, communications network interface 514 may connect to data receiver DR0 122 in FIG. 1. Computers are well known in the art and will not be described in detail herein.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for calculating a time-decayed aggregate from a data stream comprising a sequence of tuples, each tuple comprising an item identifier and an associated timestamp, comprising the steps of:
generating a smooth decay function wherein said smooth decay function is a function of the difference between a current time and the timestamps;
generating a set of linear data summaries, based at least in part on a first set of timestamps;
generating a set of boundaries, based at least in part on the smooth decay function and on a second set of timestamps;
adding, with a data processor, each tuple to a specific linear data summary based at least in part on the timestamp associated with the tuple;
merging two linear data summaries based at least in part on the set of boundaries; and,
calculating, with the data processor, said aggregate from the set of linear data summaries.

2. The method of claim 1,
wherein the sequence of tuples is represented by the set $\{<x_i, t_i>\}$ wherein $x_i$, is the item identifier of the i-th tuple, $t_i$ is the timestamp associated with the i-th tuple, and i is a sequential integer index of the i-th tuple;
wherein the decay function is represented by the function $g(t-t_i)$ wherein t is the current time;
wherein the set of linear data summaries is represented by the set $\{s_j\}$ wherein linear data summary $s_j$ summarizes the statistical characteristics of tuples with associated timestamps $t_i$, in the range $t_j < t_i < t_{j+1}$;
wherein the set of boundaries $b_i$, is generated by the relationship $g(b_i)=(1+\theta)^{-i}$ where $\theta$ is an accuracy parameter; and,
wherein two linear data summaries are merged if the following relationship is true: $(t-b_i) < t_{j+2} < t_j < (t-b_{i+1})$.

3. The method of claim 1 wherein the set of linear data summaries is a quantile-digest data structure.

4. The method of claim 1 further comprising the step of compressing the set of linear data summaries.

5. The method of claim 1 wherein said decay function is a polynomial decay function.

6. The method of claim 1 wherein said time-decayed aggregate is a time-decayed user-defined aggregate function.

7. The method of claim 1 wherein said time-decayed aggregate is a time-decayed count.

8. The method of claim 1 wherein said time-decayed aggregate is a time-decayed range.

9. The method of claim 1 wherein said time-decayed aggregate is a time-decayed quantile.

10. The method of claim 1 wherein said time-decayed aggregate is a time-decayed heavy hitter.

11. An apparatus for calculating a time-decayed aggregate from a data stream comprising a sequence of tuples, each tuple comprising an item identifier and an associated timestamp, comprising the steps of:
means for generating a smooth decay function wherein said smooth decay function is a function of the difference between a current time and the timestamps;
means for generating a set of linear data summaries, based at least in part on a first set of timestamps;
means for generating a set of boundaries, based at least in part on the smooth decay function and on a second set of timestamps;
means for adding each tuple to a specific linear data summary based at least in part on the timestamp associated with the tuple;
means for merging two linear data summaries based at least in part on the set of boundaries; and, means for calculating said aggregate from the set of linear data summaries.

12. The apparatus of claim 11, further comprising means for generating a quantile-digest data structure.

13. The apparatus of claim 11, further comprising means for compressing the set of linear data summaries.

14. The apparatus of claim 11, further comprising means for calculating a time-decayed user-defined aggregate function.

15. The apparatus of claim 11, further comprising means for calculating a time-decayed count.

16. The apparatus of claim 11, further comprising means for calculating a time-decayed range.

17. The apparatus of claim 11, further comprising means for calculating a time-decayed quantile.

18. The apparatus of claim 11, further comprising means for calculating a heavy hitter.

19. A non-transitory computer readable medium storing computer program instructions for calculating a time-decayed aggregate from a data stream comprising a sequence of tuples, each tuple comprising an item identifier and an associated timestamp, the computer program instructions defining the steps of:

generating a smooth decay function wherein said smooth decay function is a function of the difference between a current time and the timestamps;

generating a set of linear data summaries, based at least in part on a first set of timestamps;

generating a set of boundaries, based at least in part on the smooth decay function and on a second set of timestamps;

adding each tuple to a specific linear data summary based at least in part on the timestamp associated with the tuple;

merging two linear data summaries based at least in part on the set of boundaries; and, calculating said aggregate from the set of linear data summaries.

20. The non-transitory computer readable medium of claim 19 wherein said computer program instructions defining the step of generating a set of linear data summaries further comprise computer program instructions defining the step of:

generating a quantile-digest data structure.

21. The non-transitory computer readable medium of claim 19 wherein said computer program instructions further comprise computer program instructions defining the step of:

compressing the set of linear data summaries.

22. The non-transitory computer readable medium of claim 19 wherein said computer program instructions defining the step of calculating a time-decayed aggregate further comprise computer instructions defining the step of:

calculating a time-decayed user-defined aggregate function.

23. The non-transitory computer readable medium of claim 19 wherein said computer program instructions defining the step of calculating a time-decayed aggregate further comprise computer instructions defining the step of:

calculating a time-decayed range.

24. The non-transitory computer readable medium of claim 19 wherein said computer program instructions defining the step of calculating a time-decayed aggregate further comprise computer instructions defining the step of:

calculating a time-decayed quantile.

25. The non-transitory computer readable medium of claim 19 wherein said computer program instructions defining the step of calculating a time-decayed aggregate further comprise computer instructions defining the step of:

calculating a time-decayed heavy hitter.

* * * * *

UNITED STATES PATENT AND TRADEMARK OFFICE
CERTIFICATE OF CORRECTION

| | | |
|---|---|---|
| PATENT NO. | : 8,484,269 B2 | |
| APPLICATION NO. | : 12/006333 | |
| DATED | : July 9, 2013 | |
| INVENTOR(S) | : Graham Cormode et al. | |

It is certified that error appears in the above-identified patent and that said Letters Patent is hereby corrected as shown below:

On the Title page, after Item (73) "Assignee: AT&T Intellectual Property I, L.P., Atlanta, GA (US)" add the following assignee: --Iowa State University Research Foundation, Inc., Ames, Iowa (US)--

Signed and Sealed this
Thirty-first Day of December, 2013

Margaret A. Focarino
*Commissioner for Patents of the United States Patent and Trademark Office*